United States Patent
Bodnaruk et al.

(10) Patent No.: US 10,381,787 B1
(45) Date of Patent: Aug. 13, 2019

(54) VOLTAGE PROTECTION FOR UNIVERSAL SERIAL BUS TYPE-C (USB-C) CONNECTOR SYSTEMS

(71) Applicant: Cypress Semiconductor Corporation, San Jose, CA (US)

(72) Inventors: Nicholas Alexander Bodnaruk, Sunnyvale, CA (US); Derwin W. Mattos, San Mateo, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/146,802

(22) Filed: Sep. 28, 2018

Related U.S. Application Data

(60) Provisional application No. 62/674,339, filed on May 21, 2018.

(51) Int. Cl.
*H01R 13/66* (2006.01)
*H01R 24/60* (2011.01)
(Continued)

(52) U.S. Cl.
CPC ..... *H01R 13/6666* (2013.01); *G06F 13/4282* (2013.01); *H01R 24/60* (2013.01); *H02H 3/20* (2013.01); *G06F 2213/0042* (2013.01)

(58) Field of Classification Search
CPC .......... G06F 1/26; G06F 1/30; G06F 13/4282; G06F 2213/0042; H01R 13/6666; H01R 24/60; H02H 1/06; H02H 11/003; H02H 3/003; H02H 3/023; H02H 3/18; H02H 3/20; H02H 3/202; H02H 7/20; H02H 9/04; H02H 9/041; H02H 9/045; H02H 9/048;
(Continued)

(56) References Cited

U.S. PATENT DOCUMENTS 8,541,981 B2  9/2013 Zhang et al.
9,018,924 B2  4/2015 Vemula
(Continued)

FOREIGN PATENT DOCUMENTS

FR    2961363 A1    12/2011

OTHER PUBLICATIONS

"TPD6S300 USB Type-C Port Protector: Short-to-VBus Overvoltage and IEC ESD Protection," Texas Instruments, Jan. 2017, pp. 1-34; 34 pages.
(Continued)

*Primary Examiner* — Scott Bauer
*Assistant Examiner* — Nicolas Bellido

(57) ABSTRACT

An electronic device includes a first switch configured to connect a first sideband use (SBU) terminal of a Universal Serial Bus Type-C (USB-C) controller to a first SBU terminal of a USB-C receptacle. The electronic device also includes a second switch configured to connect a second sideband use (SBU) terminal of the USB-C controller to a second SBU terminal of the USB-C receptacle. The electronic device further includes a voltage protection circuit configured to deactivate one or more of the first switch and the second switch when a voltage exceeding a predetermined threshold is detected. The voltage protection circuit includes a first set of diodes coupled to the first SBU terminal of the USB-C controller and a second set of diodes coupled to the second SBU terminal of the USB-C controller.

20 Claims, 13 Drawing Sheets

(51) Int. Cl.
*H02H 3/20* (2006.01)
*G06F 13/42* (2006.01)

(58) Field of Classification Search
CPC ............. H02J 2007/0062; H02J 7/0021; H02J 7/0029; H02J 7/0052; H02J 7/007
See application file for complete search history.

(56) References Cited

U.S. PATENT DOCUMENTS

| | | |
|---|---|---|
| 9,400,546 B1 | 7/2016 | Agarwal et al. |
| 9,472,511 B2 | 10/2016 | Lee et al. |
| 9,800,233 B1 | 10/2017 | Hilal |
| 9,958,889 B2 | 5/2018 | Pons |
| 10,014,851 B2 | 7/2018 | Chauhan et al. |
| 2010/0073837 A1* | 3/2010 | Predtetchenski ... G06F 13/4072 361/91.5 |
| 2011/0266624 A1 | 11/2011 | Duvvury et al. |
| 2016/0190794 A1* | 6/2016 | Forghani-Zadeh ...... H02H 7/20 361/86 |
| 2016/0351699 A1 | 12/2016 | Boos et al. |
| 2017/0139871 A1 | 5/2017 | Yeh |
| 2017/0195778 A1* | 7/2017 | Zhao .................... H04R 1/1091 |
| 2017/0271322 A1 | 9/2017 | Russ et al. |
| 2017/0336819 A1 | 11/2017 | Pons |
| 2017/0344098 A1 | 11/2017 | Hilal |
| 2017/0346240 A1* | 11/2017 | Oporta .................. G06F 13/385 |
| 2018/0254648 A1* | 9/2018 | Harju .................... H02J 7/0052 |
| 2018/0341309 A1* | 11/2018 | Sporck .................... G06F 1/266 |

OTHER PUBLICATIONS

International Search Report for International Application No. PCT/US19/31964 dated Jun. 7, 2019; 2 pages.
Written Opinion for the International Searching Authority for International Application No. PCT/US19/31964 dated Jun. 7, 2019; 3 pages.

\* cited by examiner

VOLTAGE PROTECTION FOR UNIVERSAL SERIAL BUS TYPE-C (USB-C) CONNECTOR SYSTEMS

CROSS-REFERENCE TO RELATED APPLICATIONS

This application claims the benefit of U.S. Provisional Application No. 62/674,339 filed on May 21, 2018, the entire contents of which are hereby incorporated by reference.

TECHNICAL FIELD

Aspects of the present disclosure generally relate to Universal Serial Bus (USB) Type-C connector subsystems, and more particularly, to voltage protection for USB Type-C connector subsystems.

BACKGROUND

Various electronic devices (e.g., such as smartphones, tablets, notebook computers, laptop computers, hubs, chargers, adapters, etc.) are configured to transfer power through a USB-C connector system. For example, in some applications an electronic device may be configured as a power consumer to receive power through a USB-C connector system (e.g., for battery charging), while in other applications an electronic device may be configured as a power provider to provide power to another device that is connected thereto through a USB-C connector system. Electronic devices are typically configured to transfer power through Field Effect Transistors (FETs), or other similar switching devices. In some instances, the FETs may become susceptible to electrical damage (e.g., voltage damage, overheating damage, and so forth) due to, for example, one or more electrical faults possibly occurring on the USB-C connector system.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
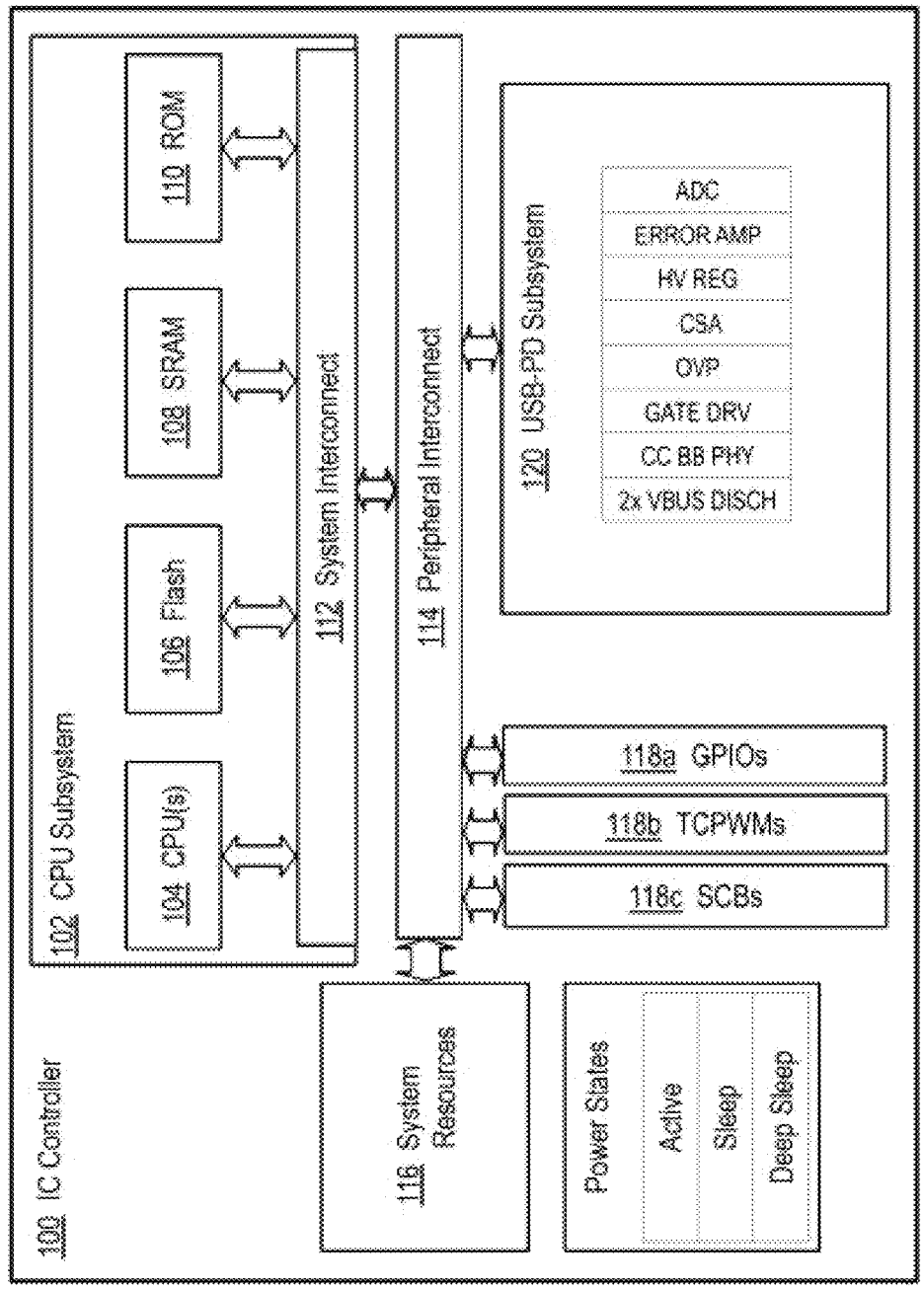
FIG. 1 is a block diagram that illustrates integrated circuit (IC) controller system, in accordance with some embodiments of the present disclosure.

Described herein are various embodiments of techniques for voltage protection for USB-C connector systems in electronic devices. Examples of such electronic devices include, without limitation, personal computers (e.g., laptop computers, notebook computers, and so forth), mobile computing devices (e.g., tablets, tablet computers, e-reader devices, and so forth), mobile communication devices (e.g., smartphones, cell phones, personal digital assistants, messaging devices, pocket PCs, and so forth), connectivity and charging devices (e.g., hubs, docking stations, adapters, chargers, etc.), audio/video/data recording and/or playback devices (e.g., cameras, voice recorders, hand-held scanners, monitors, and so forth), and other similar electronic devices that can use USB connectors (interfaces) for communication and/or battery charging.

A USB-enabled electronic device or a system may comply with at least one release of a Universal Serial Bus (USB) specification. Examples of such USB specifications include, without limitation, the USB Specification Revision 2.0, the USB 3.0 Specification, the USB 3.1 Specification, and/or various supplements (e.g., such as On-The-Go, or OTG), versions and errata thereof. The USB specifications generally define the characteristics (e.g., attributes, protocol definition, types of transactions, bus management, programming interfaces, etc.) of a differential serial bus that are required to design and build standard communication systems and peripherals. For example, a USB-enabled peripheral device attaches to a USB-enabled host device through a USB port of the host device to form a USB-enabled system. A USB 2.0 port includes a power voltage line of 5V (denoted VBUS), a differential pair of data lines (denoted D+ or DP, and D− or DN), and a ground line for power return (denoted GND). A USB 3.0 port also provides the VBUS, D+, D−, and GND lines for backward compatibility with USB 2.0. In addition, to support a faster differential bus (the USB SuperSpeed bus), a USB 3.0 port also provides a differential pair of transmitter data lines (denoted SSTX+ and SSTX−), a differential pair of receiver data lines (denoted SSRX+ and SSRX−), a power line for power (denoted DPWR), and a ground line for power return (denoted DGND). A USB 3.1 port provides the same lines as a USB 3.0 port for backward compatibility with USB 2.0 and USB 3.0 communications, but extends the performance of the SuperSpeed bus by a collection of features referred to as Enhanced SuperSpeed.

A more recent technology for USB connectors, called USB Type-C, is defined in various releases and/or versions of the USB Type-C specification (e.g., such as Release 1.0 dated Aug. 11, 2014, Release 1.1 dated Apr. 3, 2015, etc.). The USB Type-C specification defines Type-C receptacle, Type-C plug, and Type-C cables that can support USB communications as well as power delivery over newer USB power delivery protocols defined in various revisions/versions of the USB-PD specification. Examples of USB Type-C functions and requirements may include, without limitation, data and other communications according to USB 2.0 and USB 3.0/3.1, electro-mechanical definitions and performance requirements for Type-C cables, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors, etc. According to the USB Type-C specification(s), a Type-C port provides VBUS, D+, D−, GND, SSTX+, SSTX−, SSRX+, and SSRX− lines, among others. In addition, a Type-C port also provides a Sideband Use (denoted SBU) line for signaling of sideband functionality and a Configuration Channel (denoted CC) line for discovery, configuration, and management of connections across a Type-C cable. A Type-C port may be associated with a Type-C plug and/or a Type-C receptacle. For case of use, the Type-C plug and the Type-C receptacle are designed as a reversible pair that operates regardless of the plug-to-receptacle orientation. Thus, a standard USB Type-C connector, disposed as a standard Type-C plug or receptacle, provides pins for four VBUS lines, four ground return (GND) lines, two D+ lines (DP1 and DP2), two D− lines (DN1 and DN2), two SSTX+ lines (SSTXP1 and SSTXP2), two SSTX− lines (SSTXN1 and SSTXN2), two SSRX+ lines (SSRXP1 and SSRXP2), two SSRX− lines (SSRXN1 and SSRXN2), two CC lines (CC1 and CC2), and two SBU lines (SBU1 and SBU2), among others.

Some USB-enabled electronic devices may be compliant with a specific revision and/or version of the USB-PD specification (e.g., such as Revision 1.0 released Jul. 5, 2012, Revision 2.0 released Aug. 11, 2014, etc., or later revisions/versions thereof). The USB-PD specification defines a standard protocol designed to enable the maximum functionality of USB-enabled devices by providing more flexible power delivery along with data communications over a single USB Type-C cable through USB Type-C ports. The USB-PD specification also describes the architecture, protocols, power supply behavior, parameters, and cabling necessary for managing power delivery over USB Type-C cables at up to 100 W of power. According to the USB-PD specification, devices with USB Type-C ports (e.g., such as USB-enabled devices) may negotiate for more current and/or higher or lower voltages over a USB Type-C cable than are allowed in older USB specifications (e.g., such as the USB 2.0 Specification, USB 3.1 Specification, the USB Battery Charging Specification Rev. 1.1/1.2, etc.). For example, the USB-PD specification defines the requirements for a power delivery contract (PD contract) that can be negotiated between a pair of USB-enabled devices. The PD contract can specify both the power level and the direction of power transfer that can be accommodated by both devices, and can be dynamically re-negotiated (e.g., without device un-plugging) upon request by either device and/or in response to various events and conditions, such as power role swap, data role swap, hard reset, failure of the power source, etc.

An electronic device typically uses a power-transfer circuit (power path) to transfer power to/from the device. Among other electronic components, a power path may include one or more power-FETs that are coupled in-line on the circuit path to operate as switches (e.g., as "ON"/"OFF" switches). Power-FETs differ in some important characteristics from FETs and other types of transistor switch devices that are used for other, non-power-transfer applications. As a discrete semiconductor switching device, a power-FET may carry a large amount of current between its source and its drain while it is "ON", may have low resistance from its source to its drain while it is "ON", and may withstand high voltages from its source to its drain while it is "OFF". For example, a power-FET may be characterized as being able to carry currents in the range of several hundred milliamps (e.g., 500-900 mA) to several amps (e.g., 3-5 A, or higher), and to withstand voltages in the range of 12V to 40V (or higher) across its source to its drain. For example, the resistance between the source and the drain of a power-FET device may be very small in order to prevent, for example, the power loss across the device. The examples, implementations, and embodiments disclosed herein may use different types of switches, transistors, and FETs such as metal-oxide FETs (MOSFETs), nFETs (e.g., N-type MOSFETs), pFETS (e.g., P-type MOSFETS), drain extended FETs, drain extended switches, etc.

FIG. 1 illustrates an example semiconductor device that is configured in accordance with the techniques for voltage protection described herein. In the embodiment illustrated in FIG. 1, device 100 is an integrated circuit (IC) controller manufactured on a single semiconductor die. For example, IC controller 100 may be a single-chip IC device from the family of CCGx USB controllers developed by Cypress Semiconductor Corporation, San Jose, Calif. In another example, IC controller 100 may be a single-chip IC that is manufactured as a System-on-Chip (SoC). In other embodiments, the IC controller may be a multi-chip module encapsulated in a single semiconductor package. Among other components, IC controller 100 includes CPU subsystem 102, peripheral interconnect 114, system resources 116, various input/output (I/O) blocks 118 (e.g., 118a-118c), and USB-PD subsystem 120.

CPU subsystem 102 includes one or more CPUs (central processing units) 104, flash memory 106, SRAM (Static Random Access Memory) 108, and ROM (Read Only Memory) 110 that are coupled to system interconnect 112. CPU 104 is a suitable processor that can operate in an IC or a SoC device. In some embodiments, the CPU may be optimized for low-power operation with extensive clock gating and may include various internal controller circuits that allow the CPU to operate in various power states. For example, the CPU may include a wake-up interrupt controller that is configured to wake the CPU from a sleep state, thereby allowing power to be switched off when the IC chip is in the sleep state. Flash memory 106 is non-volatile memory (e.g., NAND flash, NOR flash, etc.) that is configured for storing data, programs, and/or other firmware instructions. Flash memory 106 is tightly coupled within the CPU subsystem 102 for improved access times. SRAM 108 is volatile memory that is configured for storing data and firmware instructions accessed by CPU 104. ROM 110 is read-only memory (or other suitable storage medium) that is configured for storing boot-up routines, configuration parameters, and other firmware parameters and settings. System interconnect 112 is a system bus (e.g., a single-level or multi-level Advanced High-Performance Bus, or AHB) that is configured as an interface that couples the various components of CPU subsystem 102 to each other, as well as a data and control interface between the various components of the CPU subsystem and peripheral interconnect 114.

Peripheral interconnect 114 is a peripheral bus (e.g., a single-level or multi-level AHB) that provides the primary data and control interface between CPU subsystem 102 and its peripherals and other resources, such as system resources 116, I/O blocks 118, and USB-PD subsystem 120. The peripheral interconnect 114 may include various controller circuits (e.g., direct memory access, or DMA controllers), which may be programmed to transfer data between peripheral blocks without burdening the CPU subsystem 102. In various embodiments, each of the components of the CPU subsystem and the peripheral interconnect may be different with each choice or type of CPU, system bus, and/or peripheral bus.

System resources 116 include various electronic circuits that support the operation of IC controller 100 in its various states and modes. For example, system resources 116 may include a power subsystem that provides the power resources required for each controller state/mode such as, for example, voltage and/or current references, wake-up interrupt controller (WIC), power-on-reset (POR), etc. In some embodiments, the power subsystem may also include circuits that allow IC controller 100 to draw and/or provide power from/to external sources with several different voltage and/or current levels and to support controller operation in several power states (e.g., deep sleep, sleep and active states). System resources 116 may also include a clock subsystem that provides various clocks that are used by IC controller 100, as well as circuits that implement various controller functions such as external reset.

An IC controller, such as IC controller 100, may include various different types of I/O blocks and subsystems in various embodiments and implementations. For example, in the embodiment illustrated in FIG. 1, IC controller 100 includes GPIO (general purpose input output) blocks 118a, TCPWM (timer/counter/pulse-width-modulation) blocks 118b, SCBs (serial communication blocks) 118c, and USB-PD subsystem 120. GPIOs 118a include circuits configured to implement various functions such as, for example, pull-ups, pull-downs, input threshold select, input and output buffer enabling/disabling, multiplex signals connected to various I/O pins, etc. TCPWMs 118b include circuits configured to implement timers, counters, pulse-width modulators, decoders and various other analog/mixed signal elements that are configured to operate on input/output signals. SCBs 118c include circuits configured to implement various serial communication interfaces such as, for example, I2C, SPI (serial peripheral interface), UART (universal asynchronous receiver/transmitter), CAN (Controller Area Network) interface, CXPI (Clock eXtension Peripheral Interface), etc.

USB-PD subsystem 120 provides the interface to a USB Type-C port and is configured to support USB communications as well other USB functionality, such as power delivery and battery charging. USB-PD subsystem 120 includes the electro-static discharge (ESD) protection circuits required on a Type-C port. USB-PD subsystem 120 also includes a Type-C transceiver and physical layer logic (PHY), which are configured as an integrated baseband PHY circuit to perform various digital encoding/decoding functions (e.g., Biphase Mark Code-BMC encoding/decoding, cyclical redundancy checks-CRC, etc.) and analog signal processing functions involved in physical layer transmissions. USB-PD subsystem 120 also provides the termination resistors (RP and RD) and their switches, as required by the USB-PD specification, to implement connection detection, plug orientation detection, and power delivery roles over a Type-C cable. IC controller 100 (and/or the USB-PD subsystem 120 thereof) may also be configured to respond to communications defined in a USB-PD Specification such as, for example, SOP, SOP', and SOP" messaging.

Among other circuitry, USB-PD subsystem 120 may further include: an analog-to-digital convertor (ADC) for converting various analog signals to digital signals; an error amplifier (ERROR AMP) for controlling the power source voltage applied to the VBUS line per a PD contract; a high voltage regulator (HV REG) for converting the power source voltage to the precise voltage (e.g., 3-5V) needed to power IC controller 100; a current sense amplifier (CSA) and an over-voltage protection (OVP) circuit for providing over-current and over-voltage protection on the VBUS line with configurable thresholds and response times; one or more gate drivers (GATE DRV) for controlling the power switches that turn on and off the provision of power over the VBUS line; and a communication channel PHY (CC BB PHY) logic for supporting communications on a Type-C Communication Channel (CC) line.

In accordance with the techniques described herein, USB-PD subsystem 120 may detect whether the voltage at one or more of terminals/pins of the controller exceeds a threshold voltage. If the voltage at one or more terminals/pins of the controller exceeds the threshold voltage, the USB-PD subsystem 120 may deactivate the switches that couple the one or more terminal/pins to other devices.

Voltage Protection

Figure 2:
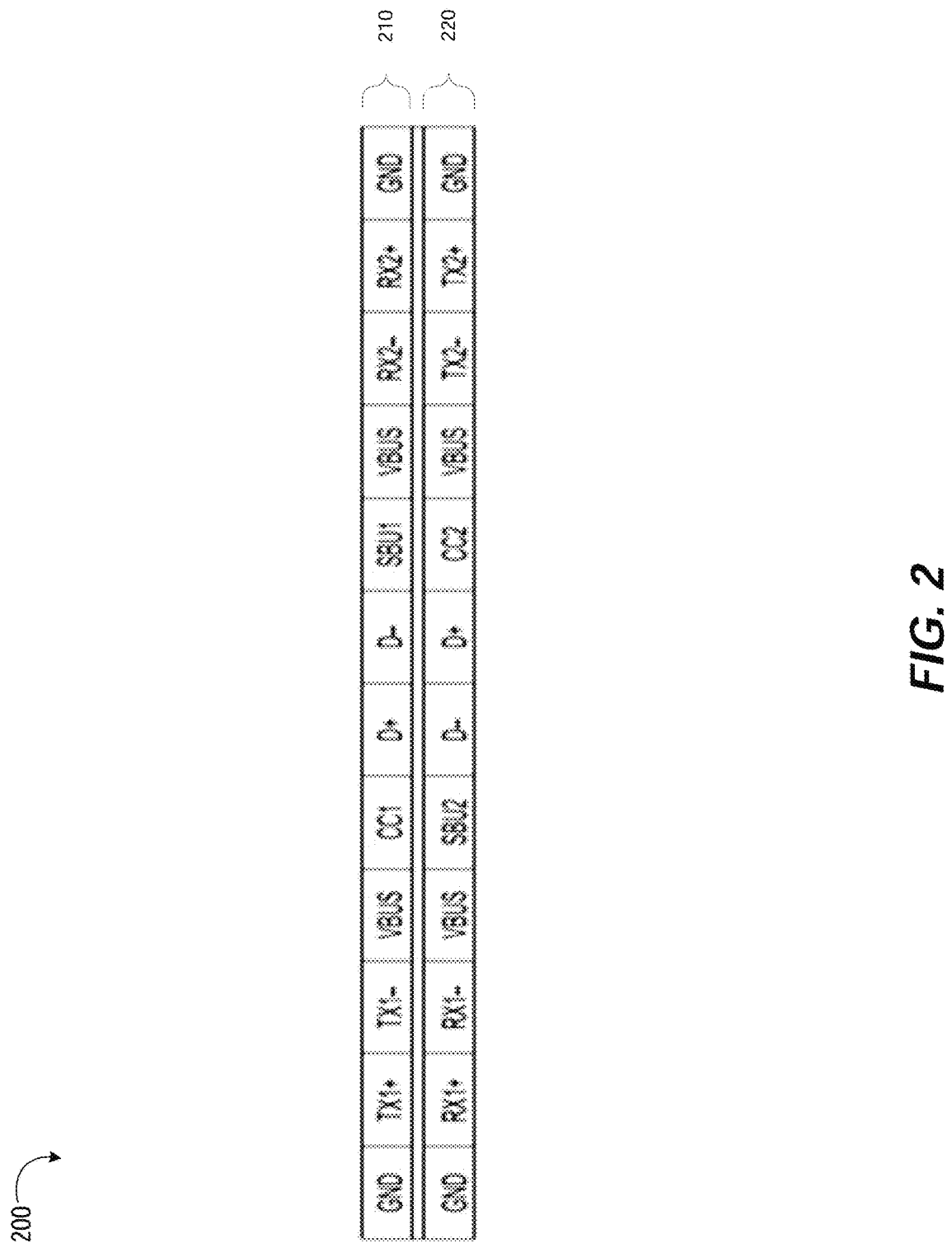
FIG. 2 is a diagram that illustrates an example pin layout for pins that may be included in a USB-C connector or USB-C receptacle, in accordance with some embodiments of the present disclosure.

FIG. 2 is a diagram that illustrates an example pin layout 200 for pins (e.g., terminals, lines, wires, traces, etc.) that may be included in a USB-C connector or USB-C receptacle, in accordance with some embodiments of the present disclosure. The pin layout 200 includes two sets of pins, set 210 and set 220. Starting from left to right, set 210 includes a GND pin, a TX1+ and TX1− pin, a VBUS pin, a CC1 pin, a D+ pin, a D− pin, a SBU1 pin, a VBUS pin, a RX2− pin, a RX2+ pin, and a GND pin. The TX1+ and TX1− in set 210 may also be referred to as SSTX1+ and TTTX1− pins, respectively. Starting from left to right, set 220 includes a GND pin, a RX1+ and RX1− pin, a VBUS pin, a SBU2 pin, a D− pin, a D+ pin, a CC2 pin, a VBUS pin, a TX2− pin, a TX2+ pin, and a GND pin. The TX2+ and TX2− in set 220 may also be referred to as SSTX2+ and TTTX2− pins, respectively.

In some embodiments, the size and symmetric form factor of USB subsystem 200 (e.g., USB Type-C subsystem) may increase the risk of one or more of the $V_{CONN}$, CC, and SBU pins becoming susceptible to fault currents due to neighboring high-voltage (e.g., up to 25V) $V_{BUS}$ pins. For example, if a USB-C connector is removed from a USB-C receptacle at an angle, this may cause the $V_{CONN}$, CC, or SBU pins (e.g., lines, terminal, traces, etc.) to short to the $V_{BUS}$ pins. The $V_{BUS}$ pins may have voltages as high as 25V. However, the CC or SBU pins may not be able to tolerate this higher voltage. This may result in a large voltage flowing being forced on the $V_{CONN}$, CC, or SBU pins from the $V_{BUS}$ pins which may damage other devices, circuits, components, modules, etc., that are coupled to the $V_{CONN}$, CC, or SBU pins. This may be referred to as an overvoltage condition or a short condition.

Figure 3A:
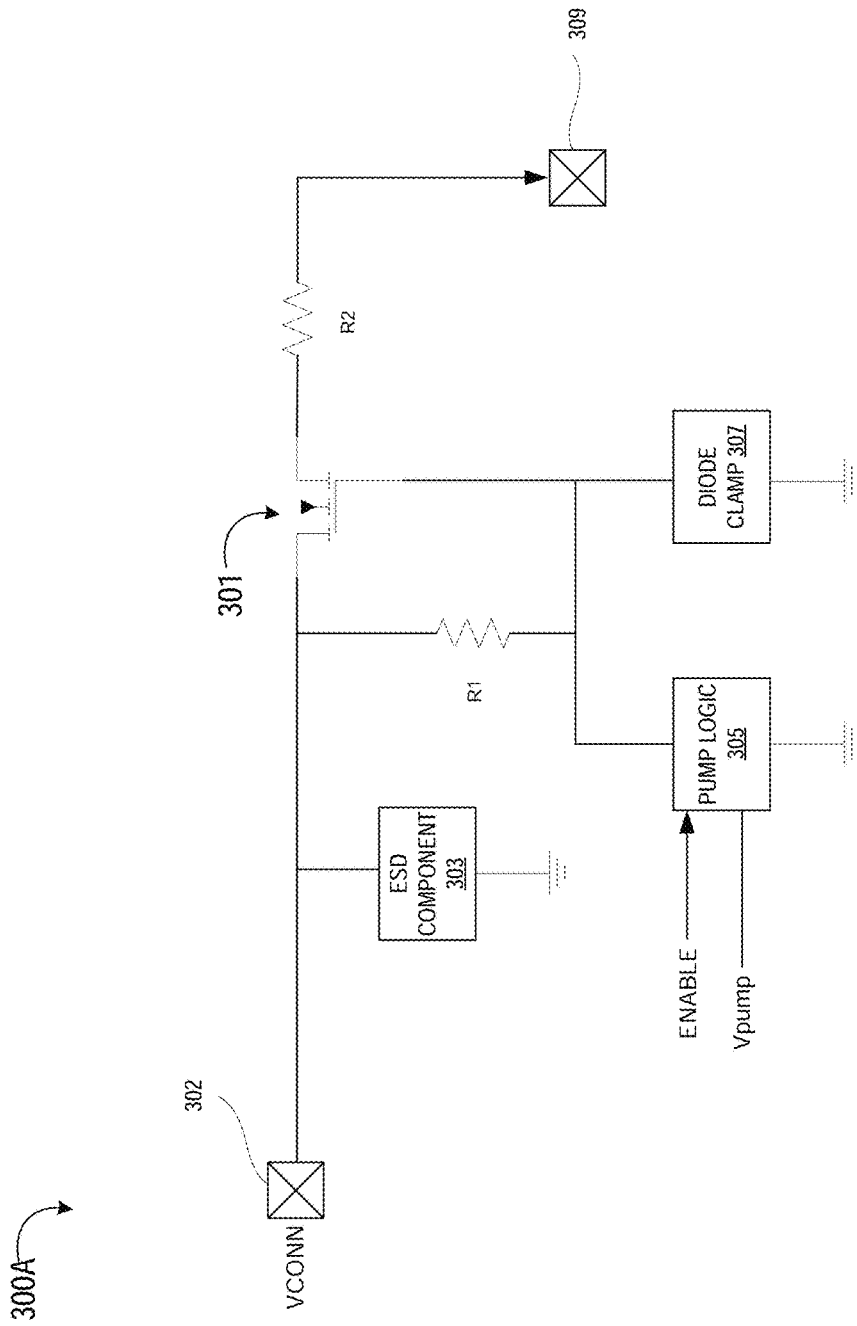
FIG. 3A is a diagram that illustrates an example USB controller, in accordance with some embodiments of the present disclosure.

FIG. 3A is a diagram that illustrates an example USB controller 300A, in accordance with some embodiments of the disclosure. The USB controller 300A may be an example of USB-PD subsystem 120 discussed above in conjunction with FIG. 1. The USB controller 300A includes a switch 301, an electrostatic discharge (ESD) component 303, a pump logic block 305, and a diode clamp 303. The ESD component 303 may protect the components of the USB controller 300A from damage due to electrostatic discharge.

In one embodiment, the diode clamp 307 may limit the gate voltage of the switch 301. For example, the diode clamp 307 may limit the gate voltage of the switch 301 to between 5V-6V. The diode clamp 307 may include one or more diodes. For example, the diode clamp 307 may include multiple 5V diode-connected N-type field effect transistors (NFETS) in series. Any number of diodes and/or FETs may be used in the diode clamp 307 to limit the gate voltage to an appropriate value.

The pump logic 305 may be used to provide a voltage ($V_{PUMP}$) to the gate of the switch 301. In some embodiments, the voltage ($V_{PUMP}$) may be around 5V, however, other voltages may be used in other embodiments. The pump logic 305 may be hardware (e.g., one or more circuits), software, firmware, or a combination thereof, configured to control the operation of one or more charge pumps and to control the operation of the switch 301. For example, the pump logic 305 may use charge pumps to provide a voltage to the gate of the switch 301 to activate the switch 301. Activating the switch 301 may allow current to flow through the switch 301. Activating the switch 301 may also be referred to turning on the switch 301. In another example, the pump logic 305 may stop providing a voltage to the gate of the switch 301 to deactivate the switch. Deactivating the switch 301 may prevent current from flowing through the switch 301. Deactivating the switch 301 may also be referred to as deactivating the switch 301, turning off the switch 301, etc.

The pump logic 305 may have an enable input. When the enable input is low (e.g., is set to "0" or some other appropriate value to indicate that the switch 301 should be deactivated), the pump logic 305 may deactivate the switch 301. When the enable input is high (e.g., is set to "1" or some other appropriate value to indicate that the switch 301 should be activated), the pump logic 305 may activate the switch 301. When the switch 301 is activated, the current and voltage VCONN received by the USB controller 300A may be provided to the output 309 via one or more pins of a USB-C connector.

In one embodiment, the switch 301 may be a drain extended N-type field effect transistor (FET) or DENFET. When the VCONN pin 302 is shorted to a VBUS pin, the diode clamp may limit the gate voltage of the switch 301. This protects the switch 301 from damage and also limits the voltage that passes through the switch 301. The controller 300A may operate for a longer or extended period of time under this condition (e.g., under the short condition) because the switch 301 may be a DENFET which can withstand a large voltage (e.g., a voltage of 25V) at the drain of the switch 301 for the extended period of time.

When the VCONN pin first shorts to the VBUS pin, there may be transmission line effects (e.g., such as ringing) on the wires, pins, cables, traces, etc., and this may cause voltage oscillations. The ESD component 303 may operate in a Gate-Induced Drain Leakage (GIDL) mode. This may limit the positive voltage oscillations such that the voltage on the wires, pins, cables, traces, etc., settles faster and does not damage the switch 301. It may also dampen the oscillations such that they die out faster.

As discussed above, using one or more DENFETS for the switch 301 and the diode clamp 307 may help prevent damage to the switch 301 when the VCONN pin shorts to the VBUS pin. This may also limit the voltage that passes through the switch 301. Limiting the voltage that passes through the switch 301 may prevent damage to the devices that are coupled to the output 309. This allows a normal range of voltage to pass through the switch 301 while prevent the voltage from going too high, which may damage the switch 301 and other devices coupled to the output 309.

In one embodiment, the diode clamp 307, the pump logic 305 may be part of the USB controller 300A. For example, instead of being separate from the USB controller 300A, the diode clamp 307, the pump logic 305 and the switch 301 (e.g., one or more DENFETS) are on-chip or are part of the USB controller 300A. Including the diode clamp 307, the pump logic 305, and the switch 301 as part of the USB controller 300A allows the total resistance of the switch 301 to be reduced. For example, using the VPUMP voltage to drive the switch gate may reduce the total resistance of the switch 301. Reducing the total resistance of the switch 301 may allow the USB controller 300A or a device coupled to the USB controller 300A to operate with more power efficiency (e.g., to use less power). Including the diode clamp 307, the pump logic 305, and the switch 301 as part of the USB controller 300A may also reduce the cost of the device.

Figure 3B:
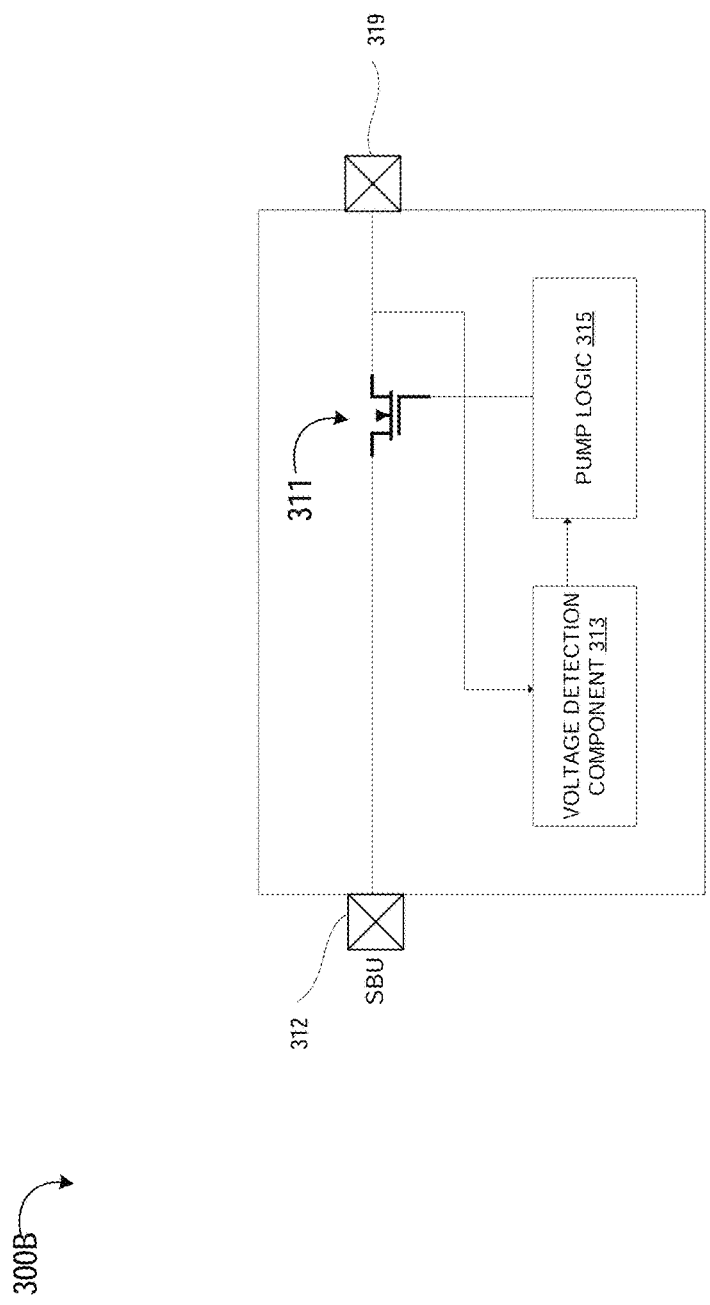
FIG. 3B is a diagram that illustrates an example USB controller, in accordance with some embodiments of the present disclosure.

FIG. 3B is a diagram that illustrates an example USB controller 300B, in accordance with some embodiments of the disclosure. The USB controller 300B may be an example of USB-PD subsystem 120 discussed above in conjunction with FIG. 1. The USB controller 300B includes a switch 311, a voltage detection component 313, and a pump logic 315.

The pump logic 315 may be used to provide a voltage ($V_{PUMP}$) to the gate of the switch 311. In some embodiments, the voltage ($V_{PUMP}$) may be around 5V, however, other voltages may be used in other embodiments. The pump logic 315 may be hardware (e.g., one or more circuits), software, firmware, or a combination thereof, configured to control the operation of one or more charge pumps and to control the operation of the switch 311. For example, the pump logic 315 may use charge pumps to provide a voltage to the gate of the switch 311 to activate the switch 311. Activating the switch 311 may allow current to flow through the switch 311. Activating the switch 311 may also be referred to as activating the switch 311, turning on the switch 311, etc. In another example, the pump logic 315 may stop providing a voltage to the gate of the switch 311 to deactivate the switch. Deactivating the switch 311 may prevent current from flowing through the switch 311. Deactivating the switch 311 may also be referred to as deactivating the switch 311, turning off the switch 311, etc. The pump logic 315 may receive an input from or may be controlled by the voltage detection component 313.

The pump logic 315 may have an enable input. When the enable input is low (e.g., is set to "0" or some other appropriate value to indicate that the switch 311 should be deactivated), the pump logic 315 may deactivate the switch 311. When the enable input is high (e.g., is set to "1" or some other appropriate value to indicate that the switch 311 should be activated), the pump logic 315 may activate the switch 311. When the switch 311 is activated, the SBU pin 312 may be coupled to the output 319. In one embodiment, the switch 311 may be a drain extended switch (e.g., a DENFET).

The voltage detection component 313 may be hardware (e.g., one or more circuits), software, firmware, or a combination thereof, configured to detect when a voltage from the SBU pin 312 is above a threshold voltage. If the voltage from the SBU pin 312 is greater than the threshold voltage, the voltage detection component 313 may cause the pump logic 315 to turn off or deactivate the switch 311 to prevent damage to components, devices, etc., that are coupled to the output 319. The voltage detection component 313 may include one or more diodes. For example, the voltage detection component 313 may include multiple 5V diode-connected P-type field effect transistors (PFETS) in series. Any number of diodes and/or FETs may be used in the voltage detection component 313. The threshold voltage may be based on the number of diodes or diode-connected PFETS in the voltage detection component 313. For example, the larger the number of diodes, the larger the threshold voltage, and vice versa.

As illustrated in FIG. 3B, the voltage detection component 313 may be configured to detect when a high voltage condition (e.g., a condition where a larger voltage is detected at the SBU pin 312, a super high voltage condition, etc.). If the voltage detection component 313 determines that a high voltage condition has occurred, the voltage detection component 313 may generate a signal (e.g., a disable or enable signal) that may be provided to the pump logic 305. This allows the pump logic 315 to deactivate, turn off, etc., the switch 311 when a high voltage condition is detected by the voltage detection component 313.

As illustrated in FIG. 3B, the voltage detection component 313 is part of the USB controller 300B. Including the voltage detection component 313 and the pump logic 315 as part of the USB controller 300B allows the total resistance of the switch 311 to be reduced. Reducing the total resistance of the switch 311 may allow the USB controller 300B or a device coupled to the USB controller 300B to operate with more power efficiency (e.g., to use less power). Including the voltage detection component 313 and the pump logic 315 as part of the USB controller 300B may also reduce the cost of the device.

Figure 3C:
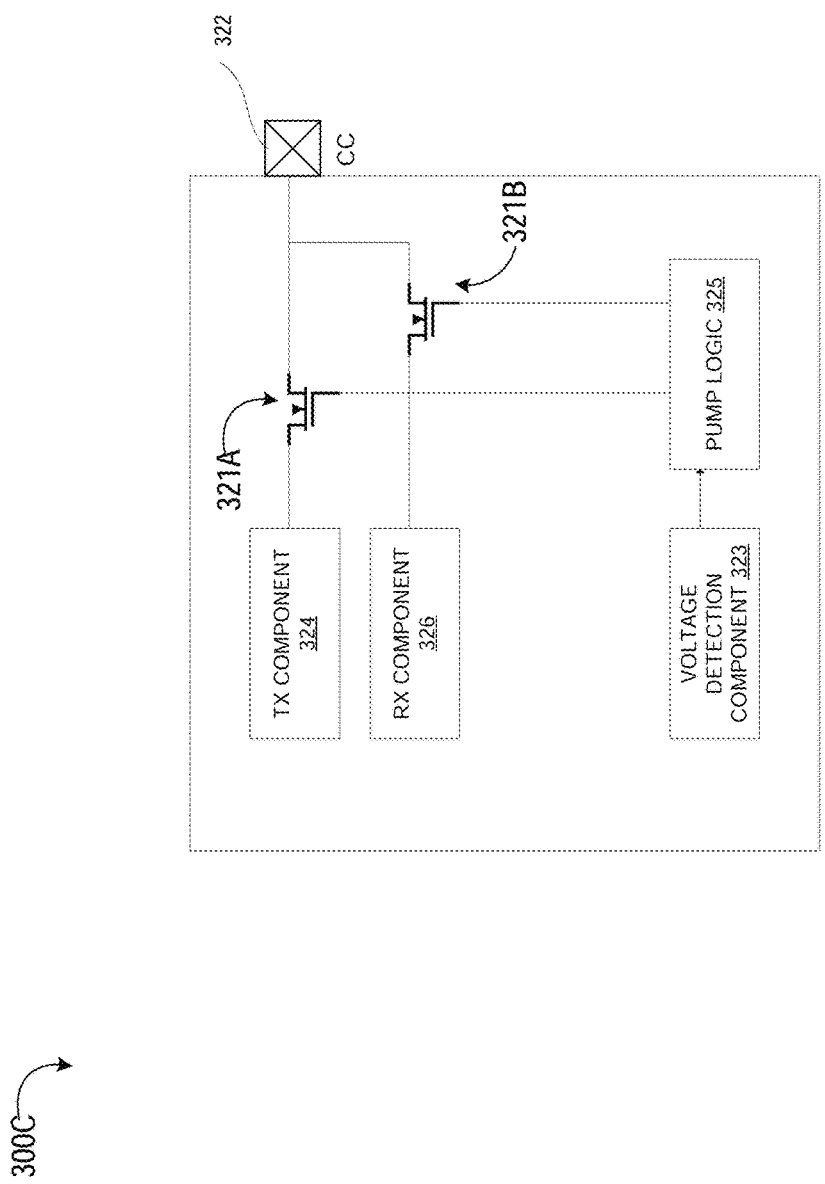
FIG. 3C is a diagram that illustrates an example USB controller, in accordance with some embodiments of the disclosure.

FIG. 3C is a diagram that illustrates an example USB controller 300C, in accordance with some embodiments of the disclosure. The USB controller 300C may be an example of USB-PD subsystem 120 discussed above in conjunction with FIG. 1. The USB controller 300C includes a switch 321A, switch 321B, a transmission (TX) component 324, a receiving (RX) component 326, a voltage detection component 323, and a pump logic 325. The TX component 324 may take data from a device coupled to the USB controller 300C and transmit that data onto the CC pin 322. The RX component may receive data from the CC pin and convey that data to the device coupled to the USB controller 300C.

The pump logic 325 may be used to provide a voltage ($V_{PUMP}$) to the gates of the switches 321A and 321B. In some embodiments, the voltage ($V_{PUMP}$) may be around 5V, however, other voltages may be used in other embodiments. The pump logic 325 may be hardware (e.g., one or more circuits), software, firmware, or a combination thereof, configured to control the operation of one or more charge pumps and to control the operation of the switches 321A and 321B. For example, the pump logic 325 may use charge pumps to provide a voltage to the gates of the switches 321A and 321B to activate the switches 321A and 321B. Activating the switches 321A and 321B may allow current to flow through the switches 321A and 321B. Activating the switches 321A and 321B may also be referred to as activating the switches 321A and 321B, turning on the switches 321A and 321B, etc. In another example, the pump logic 325 may stop providing a voltage to the gates of the switches 321A and 321B to deactivate the switch. Deactivating the switches 321A and 321B may prevent current from flowing through the switches 321A and 321B. Deactivating the switches 321A and 321B may also be referred to as deactivating the switches 321A and 321B, turning off the switches 321A and 321B, etc. The pump logic 325 may receive an input from or may be controlled by the voltage detection component 323.

The pump logic 325 may have an enable input. When the enable input is low (e.g., is set to "0" or some other appropriate value to indicate that the switches 321A and 321B should be deactivated), the pump logic 325 may deactivate the switches 321A and 321B. When the enable input is high (e.g., is set to "1" or some other appropriate value to indicate that the switches 321A and 321B should be activated), the pump logic 325 may activate the switches 321A and 321B. When the switches 321A and 321B are activated, the CC pin 322 may be coupled to one or more devices that are coupled to the USB controller 300C. In one embodiment, the switches 321A and 321B may be a drain extended switch (e.g., a DENFET).

The voltage detection component 323 may be hardware (e.g., one or more circuits), software, firmware, or a combination thereof, configured to detect when a voltage from the CC pin 322 is above a threshold voltage. If the voltage from the CC pin 322 is greater than the threshold voltage, the voltage detection component 323 may cause the pump logic 325 to deactivate or deactivate the switches 321A and 321B to prevent damage to components, devices, etc., that are coupled to the USB controller 300C. The voltage detection component 323 may include one or diodes. For example, the voltage detection component 323 may include multiple 5V diode-connected P-type field effect transistors (PFETS) in series. Any number of diodes and/or FETs may be used in the voltage detection component 323. The threshold voltage may be based on the number of diodes or diode-connected PFETS in the voltage detection component 323. For example, the larger the number of diodes, the larger the threshold voltage, and vice versa.

As illustrated in FIG. 3C, the voltage detection component 323 may be configured to detect when a high voltage condition (e.g., a condition where a larger voltage is detected at the CC pin 322, a super high voltage condition, etc.). If the voltage detection component 323 determines that a high voltage condition has occurred, the voltage detection component 323 may generate a signal (e.g., a disable or enable signal) that may be provided to the pump logic 325. This allows the pump logic 325 to deactivate, turn off, etc., the switches 321A and 321B when a high voltage condition is detected by the voltage detection component 323.

As illustrated in FIG. 3C, the voltage detection component 323 is part of the USB controller 300C. Including the voltage detection component 323 as part of the USB controller 300C allows the total resistance of the switches 321A and 321B to be reduced. Reducing the total resistance of the switches 321A and 321B may allow the USB controller 300C or a device coupled to the USB controller 300C to operate with more power efficiency (e.g., to use less power). Including the voltage detection component 323 as part of the USB controller 300C may also reduce the cost of the device.

Figure 4A:
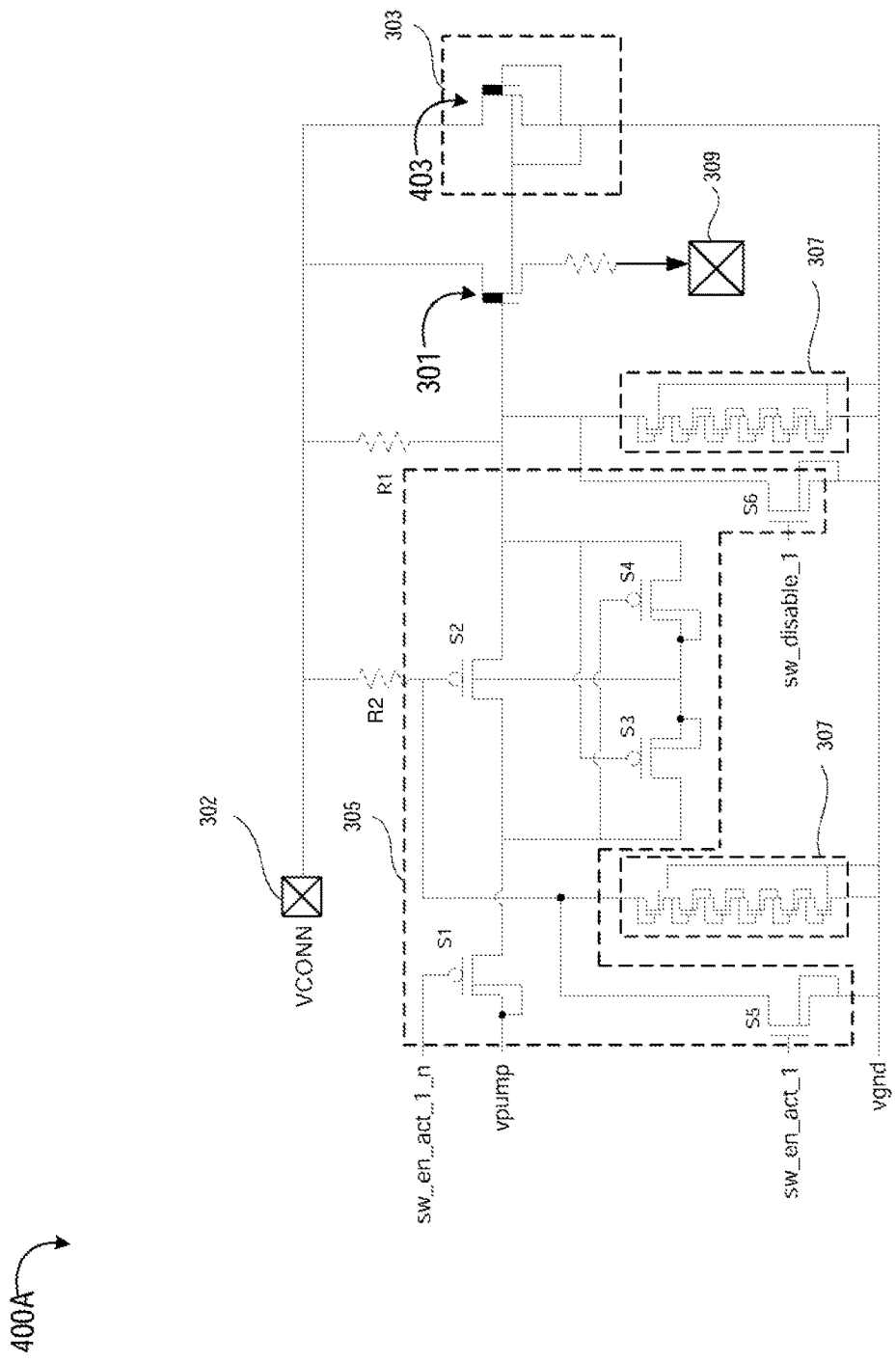
FIG. 4A is a diagram that illustrates an example USB controller, in accordance with some embodiments of the present disclosure.

FIG. 4A is a diagram that illustrates an example USB controller 400A, in accordance with some embodiments of the present disclosure. The USB controller 400A may be an example of USB-PD subsystem 120 discussed above in conjunction with FIG. 1. The USB controller 400A includes a switch 301, an electrostatic discharge (ESD) component 303, a pump logic 305, and diode clamps 307. The ESD component 303 may protect the components of the USB controller 400A from damage due to electrostatic discharge. The ESD component 303 may include a DENFET 403.

Each of the diode clamps 307 includes multiple diode-connected NFETS that are connected in series. For example, each of the diode clamps 307 may include multiple 5V diode-connected NFETS connected in series. Any number of diodes and/or FETs may be used in the diode clamp 307. In addition, different types of diode-connected NFETS may be used. For example a first diode clamp 307 may include 5V diode-connected NFETS and a second diode clamp 307 may include 3V diode-connected NFETS. In one embodiment, the diode clamps 307 may limit the gate voltage of the switch 301. For example, the diode clamps 307 may limit the gate voltage of the switch 301 to between 5V-6V.

The pump logic 305 may be used to provide a voltage (VPUMP) to the gate of the switch 301. In some embodiments, the voltage (VPUMP) may be around 5V, however, other voltages may be used in other embodiments. The pump logic 305 may be hardware (e.g., one or more circuits), software, firmware, or a combination thereof, configured to control the operation of one or more charge pumps and to control the operation of the switch 301. The pump logic 305 includes switches S1, S2, S3, S4, S5, and S6. The switches S1, S2, S3, S4, S5, and S6 may be field effect transistors (FETS) such as metal-oxide semiconductor FETS (MOSFETS). The pump logic 305 may control or provide a voltage to the gate of the switch 301 to activate the switch 301. Activating the switch 301 may allow current to flow through the switch 301. Activating the switch 301 may also be referred to turning on the switch 301, turning on the switch 301, etc. In another example, the pump logic 305 may stop providing a voltage to the gate of the switch 301 to deactivate the switch. Deactivating the switch 301 may prevent current from flowing through the switch 301. Deactivating the switch 301 may also be referred to as deactivating the switch 301, turning off the switch 301, etc.

The USB controller 400A may operate in different modes or configurations. In a startup mode, sw_en_act_1=0 and sw_en_act_1_n=1, so both S5 and S1 are deactivated (e.g., OFF). sw_disable=0 so S6 is also deactivated. The VPUMP voltage is not yet enabled, so the resistor R1 may pull the gate of the switch 301 to the VCONN voltage. Resistor R2 may pull up the gate of S2 to VCONN, so S2 is also deactivated. S3 and S4 act to choose the higher voltage of S2's drain and source. In this case, the drain of S2 is VCONN, which is the higher voltage, so the bulk of S2 gets VCONN voltage. This means the only path that pulls up the gate of 301 is R1, which is enough to turn on switch 301 and pass voltage to output 309 that is equal to VCONN minus the voltage Vt of the switch 301. This allows the VCONN voltage to pass through the switch 301 to the output 309, minus the threshold voltage of the switch 301. In an active mode, sw_en_act_1=1 and sw_en_act_1_n=0, so both S5 and S1 are activated (e.g., ON). sw_disable_1=0, so S6 is deactivated. Since S5 is activated, gate of S2 is pulled low (overriding the R2 pull-up since it may be a weak transistor), so S2 is activated. S1 and S2 are both activated, so Vpump voltage is passed through to the gate of 301 (overriding the R1 connection to VCONN since it may be a weak transistor). Since the gate of switch 301 is now at the Vpump voltage, the voltage passed to the output 309 is the smaller of (VCONN, Vpump minus Vt of the switch 301). S3 and S4 act to choose the higher voltage of S2's drain and source. In this case both are Vpump, so S2 bulk gets Vpump voltage.

The USB controller 400A may also have a disabled mode. In disabled mode, sw_en_act_1=0 and sw_en_act_1_n=1, so both S5 and S1 are deactivated. sw_disable_1=1, so S6 is activated. R2 pulls up the gate of S2 to VCONN, so S2 is also deactivated. Since S6 is activated, the gate of 301 is pulled low, and so the switch 301 is deactivated (e.g., no voltage is passed to the output 309).

In one embodiment, the switch 301 may be a drain extended switch (e.g., a drain extended N-type field effect transistor (FET) or DENFET). When the VCONN pin 302 is shorted to a VBUS pin, the diode clamp may limit the gate voltage of the switch 301. This protects the switch 301 from damage and also limits the voltage that passes through the switch 301. The controller 400A may operate for a longer or extended period of time under this condition (e.g., under the short condition) because the switch 301 may be a DENFET which can withstand a large voltage (e.g., a voltage of 25V) at the drain of the switch 301 for the extended period of time.

When the VCONN pin first shorts to the VBUS pin, there may be transmission effects on the wires, pins, cables, traces, etc., and this may cause voltage oscillations. The ESD component 303 may operate in a Gate-Induced Drain Leakage (GIDL) mode. This may limit the positive voltage oscillations such that the voltage on the wires, pins, cables, traces, etc., settles faster and does not damage the switch 301. It may also dampen the oscillations such that they die out faster.

As discussed above, using one or more DENFETS for the switch 301 and the diode clamp 307 may help prevent damage to the switch 301 when the VCONN pin shorts to the VBUS pin. This may also limit the voltage that passes through the switch 301. Limiting the voltage that passes through the switch 301 may prevent damage to the devices that are coupled to the output 309. This allows a normal range of voltage to pass through the switch 301 while prevent the voltage from going too high, which may damage the switch 301 and other devices coupled to the output 309.

In one embodiment, the pump logic 305 and the diode clamps 307 may be part of the USB controller 400A. For example, the pump logic 305, diode clamp 307, and the switch 301 (e.g., one or more DENFETS) are on-chip or are otherwise part of the USB controller 400A. Including the pump logic 305, diode clamp 307, and the switch 301 as part of the USB controller 400A allows the total resistance of the switch 301 to be reduced. Reducing the total resistance of the switch 301 may allow the USB controller 400A or a device coupled to the USB controller 400A to operate with more power efficiency (e.g., to use less power). Including the pump logic 305, diode clamp 307, and the switch 301 as part of the USB controller 400A may also reduce the cost of the device.

Figure 4B:
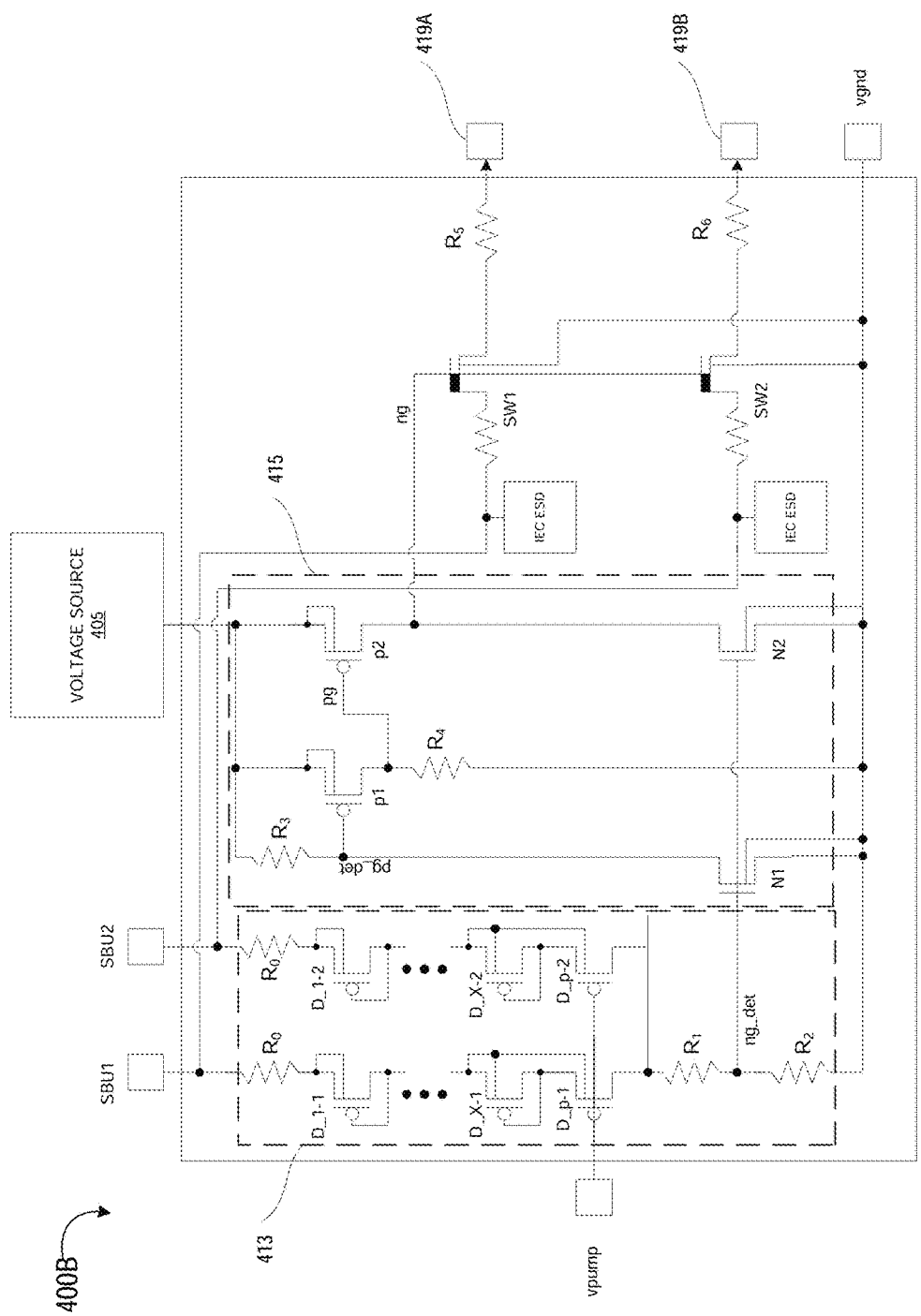
FIG. 4B is a diagram that illustrates an example USB controller, in accordance with some embodiments of the present disclosure.

FIG. 4B is a diagram that illustrates an example USB controller 400B, in accordance with some embodiments of the present disclosure. The USB controller 400B may be an example of USB-PD subsystem 120 discussed above in conjunction with FIG. 1. The USB controller 400B includes switches SW1 and SW2, a voltage detection component 413, and a pump logic 415. The switch SW1 couples the pin SBU1 to the output 419A and the switch SW2 couples the pin SBU2 to the output 419B. The SBU1 and SBU2 pins may be the SBU lines or pins used in USB-C connectors or receptacles. The voltage source 405 may provide a voltage VPUMP. The voltage VPUMP may be used to activate the switches SW1 and SW2. In one embodiment, the switches SW1 and SW2 may be DENFETS.

The voltage detection component 413 may be configured to detect when a high voltage condition (e.g., a condition where a larger voltage is detected at the SBU1 or SBU2 pins, a super high voltage condition, etc.). If the voltage detection component 413 determines that a high voltage condition has occurred, the voltage detection component 413 cause the pump logic 405 to deactivate, turn off, etc., the (first) switch SW1 and the (second) switch SW2.

In one embodiment, the voltage detection component 413 may include two sets of PFETs. The first set of PFETs includes diode-connected PFETs D_1-1 through D_X-1 and PFET D_p-1. The second set of PFETs includes diode-connected PFETs D_1-2 through D_X-2 and PFET D_p-2. The gates of the diode-connected PFETs D_1-1 through D_X-1, and D_1-2 through D_X-2 are tied to their drain in order to act like a diode (e.g. diode-connected PFETs). The gates of D_p-1 and D_p-2 may be coupled to a voltage Vpump. Under normal operation or conditions when the SBU1 and SBU2 pins are not shorted to VBUS, the PFETs D_* block the pad voltage such that ng_det is low. This low voltage (second voltage) on the gates of the (third) switch N1 and the (fourth) switch N2 is not enough to activate the switches N1 and N2. When the switches N1 and N2 are not activated, the node voltage at the nodes pg_det and pg allows the gates of (fifth) switch p1 and (sixth) switch p2 to activate which provides the voltage VPUMP to the (first) gate of switch SW1 and the (second) gate of switch SW2. This couples the SBU1 and SBU2 pins to the outputs 419A and 419B. When a high voltage condition (e.g., a short to the VBUS pin) occurs, the voltage on the SBU1 and SBU2 pins will increase (e.g., increase to 10V or more). This increased voltage will pull up the drains of sets of diode-connected PFETs and the sets of diode-connected PFETs will provide a higher voltage to the node ng_det. For example, when the voltage on the SBU1 or SBU2 pins are greater than a threshold voltage (e.g., 10V), the set of diode-connected PFETs and resistor divider comprised of resistors R1 and R2 will provide a voltage to the node ng_det that is at or above the threshold voltage of NFETs N1 and N2. This will activate the switches N1 and N2. The threshold voltage may be based on the number of diodes or diode-connected PFETS in the voltage detection component 313, as well as the vpump voltage connected to the gates of D_p-1 and D_p-2, and the resistor divider ratio of R1 and R2. For example, the larger the number of diodes, the larger the threshold voltage, and vice versa.

The pump logic 415 may activate or deactivate the switches SW1 and SW2, based on whether the voltage detection component 413 detects that the voltage at one or more of the SBU1 and SBU2 pins is greater than the threshold voltage. As discussed above, the pump logic 415 may activate the switches N1 and N2. Activating the switches N1 and N2 may cause the node ng to be pulled to ground, which deactivates the gate of switch p2. Deactivating the gate of switch p2 may prevent the voltage VPUMP from being provided to the gates of the switches SW1 and SW2 which deactivates the switches SW1 and SW2. This prevents the higher voltage from SBU1 or SBU2, due to the short, from reaching the outputs 419A and 419B.

Figure 4C:
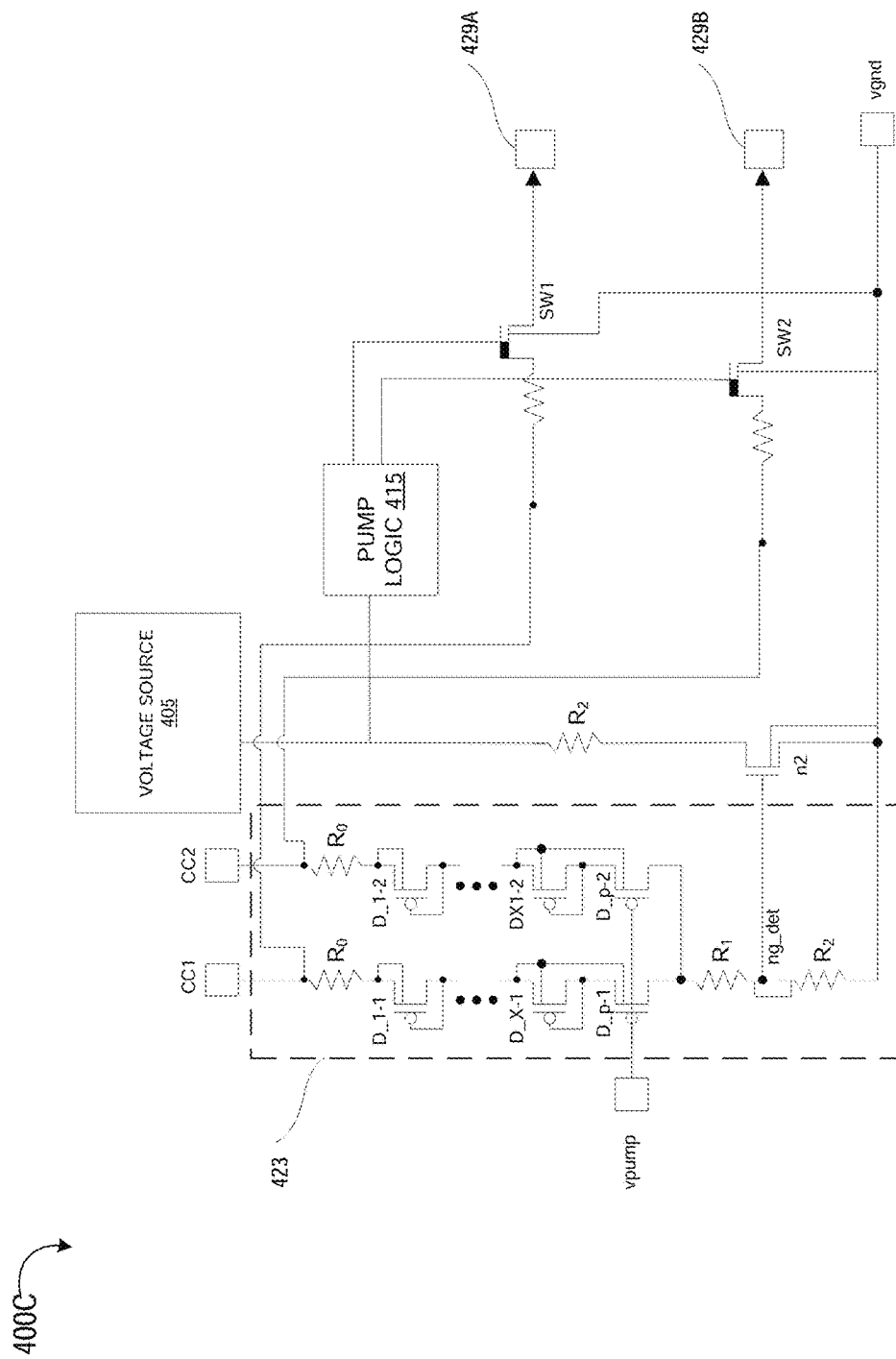
FIG. 4C is a diagram that illustrates an example USB controller, in accordance with some embodiments of the present disclosure.

FIG. 4C is a diagram that illustrates an example USB controller, in accordance with some embodiments of the present disclosure. The USB controller 400C may be an example of USB-PD subsystem 120 discussed above in conjunction with FIG. 1. The USB controller 400C includes switches SW1 and SW2, a voltage detection component 423, and a pump logic 415. The switch SW1 couples the pin CC1 to the output 429A and the switch SW2 couples the pin CC2 to the output 429B. The CC1 and CC2 pins may be the CC lines or pins used in USB-C connectors or receptacles. The voltage source 405 may provide a voltage VPUMP. The voltage VPUMP may be used to activate the switches SW1 and SW2. In one embodiment, the switches SW1 and SW2 may be DENFETS.

The voltage detection component 423 may be configured to detect when a high voltage condition (e.g., a condition where a larger voltage is detected at the CC1 or CC2 pins, a super high voltage condition, etc.). If the voltage detection component 423 determines that a high voltage condition has occurred, the voltage detection component 423 cause the pump logic 405 to deactivate, turn off, etc., the switches SW1 and SW2.

In one embodiment, the voltage detection component 423 may include two sets of PFETs. The first set of includes diode-connected PFETs D_1-1 through D_X-1 and PFET D_p-1. The second set of PFETs includes diode-connected PFETs D_1-2 through D_X-2 and PFET D_p-2. The gates of the diode-connected PFETs D_1-1 through D_X-1, and D_1-2 through D_X-2 are tied to their drain in order to act like a diode (e.g. diode-connected PFETs). The gates of D_p-1 and D_p-2 may be coupled to a voltage Vpump. Under normal operation or conditions when the CC1 and CC2 pads are not shorted to VBUS, the PFETs D_* block the pad voltage, such that the ng_det node is low voltage that is detected at the node ng_det is lower. This low voltage on the gate of the switch N2 is not enough to activate the switch N2. When the switch N2 is not activated, the pump logic 415 may allow the voltage VPUMP to be provided to the gates of switches SW1 and SW2. When the switch N2 is activated, the pump logic 415 may prevent the voltage VPUMP to be provided to the gates of switches SW1 and SW2.

The pump logic 415 may activate or deactivate the switches SW1 and SW2, based on whether the voltage detection component 423 detects that the voltage at one or more of the CC1 and CC2 pins is greater than the threshold voltage. As discussed above, the pump logic 415 may activate the switch N2. Activating the switch N2 may cause the pump logic 415 to prevent the voltage VPUMP from going to the gates of the switches SW1 and SW2, which deactivates the switches SW2 and SW2. This prevents the higher voltage, due to the short, from reaching the outputs 429A and 429B.

Figure 5:
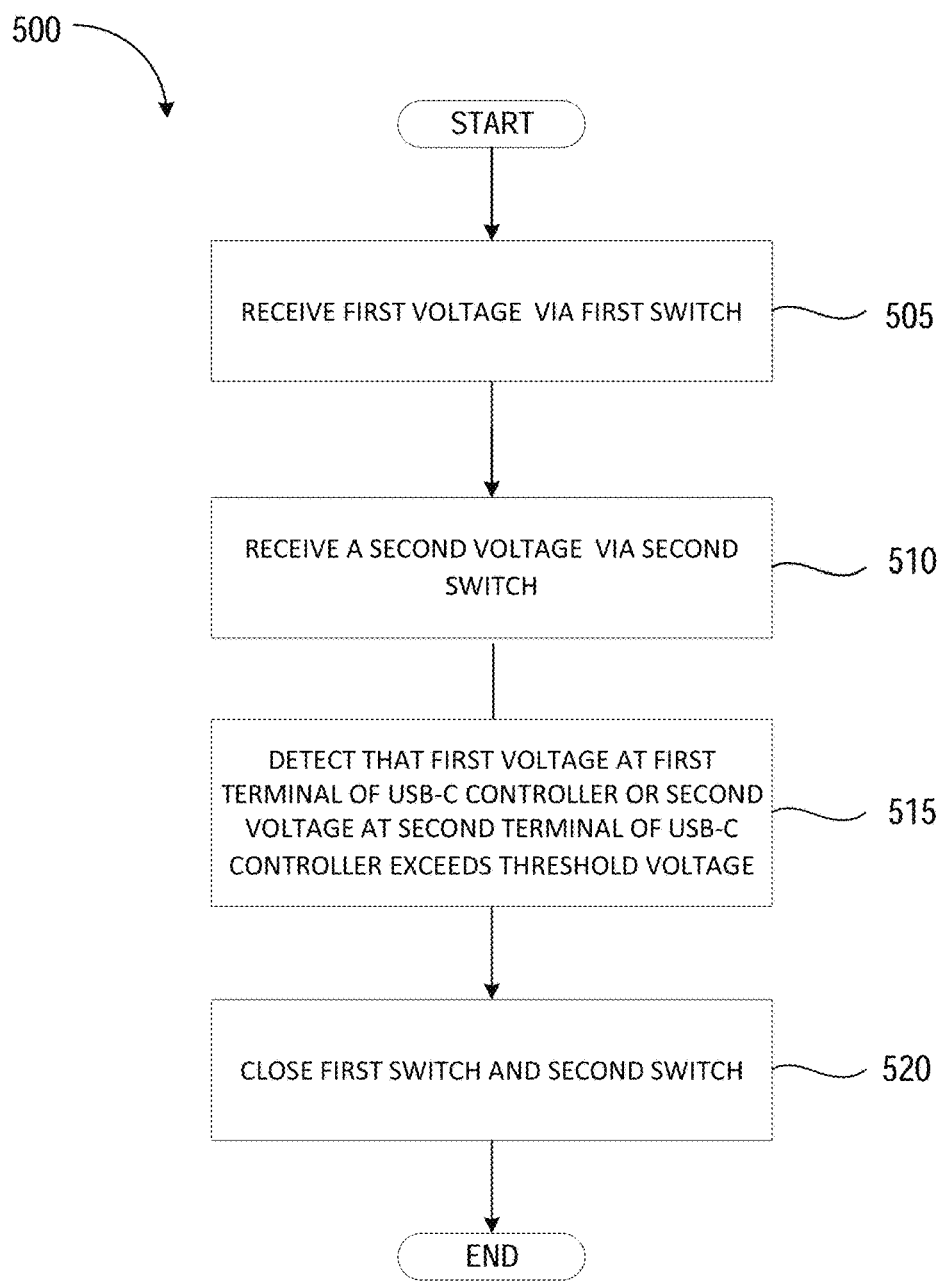
FIG. 5 is a flow diagram of a method of providing voltage protection for USB-C connector systems, in accordance with some embodiments of the present disclosure.

FIG. 5 is a flow diagram of a method of providing voltage protection for USB-C connector systems, in accordance with some embodiments of the present disclosure. Method 500 may be performed by processing logic that may comprise hardware (e.g., circuitry, dedicated logic, programmable logic, a processor, a processing device, a central processing unit (CPU), a multi-core processor, a system-on-chip (SoC), etc.), software (e.g., instructions running/executing on a processing device), firmware (e.g., microcode), or a combination thereof. In some embodiments, the method 500 may be performed by a USB-PD subsystem (e.g., USB-PD subsystem 120 illustrated in FIG. 1), a USB controller, a voltage detection component, or a pump logic.

The method 500 may begin at block 505 with receiving a first voltage via a first switch. The first switch may couple a first terminal of a USB-C controller with a first terminal of a USB-C receptacle. For example, a first CC (or SBU) terminal/pin of the USB-C controller may be coupled to a first CC (or SBU) terminal/pin of a USB receptacle. At block 510, second voltage is received via second switch. The second switch may couple a second terminal of a USB-C controller with a second terminal of a USB-C receptacle. For example, a second CC (or SBU) terminal/pin of the USB-C controller may be coupled to a second CC (or SBU) terminal/pin of a USB receptacle. At block 515, the method 500 detects that the first voltage or the second voltage at the first or second terminal of the USB-C controller exceeds a threshold voltage (e.g., using a set of diode-connected PFETs). At block 520, the method 500 may deactivate the first switch and the second switch when the voltage at one or more of the first or second terminal of the USB-C controller exceeds the threshold voltage.

Figure 6A:
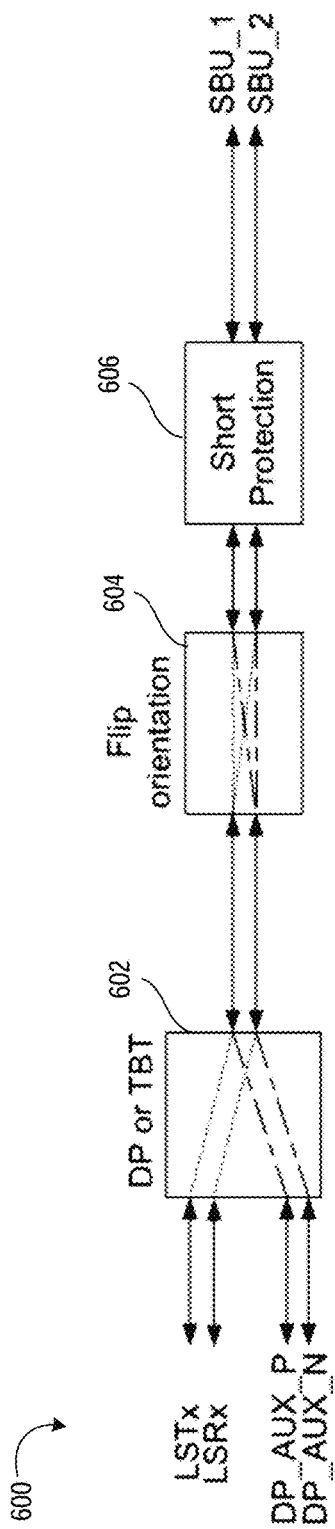
FIG. 6A is a block diagram of a SBU crossbar switch for USB-C connector systems, in accordance with some embodiments of the present disclosure.
Figure 6B:
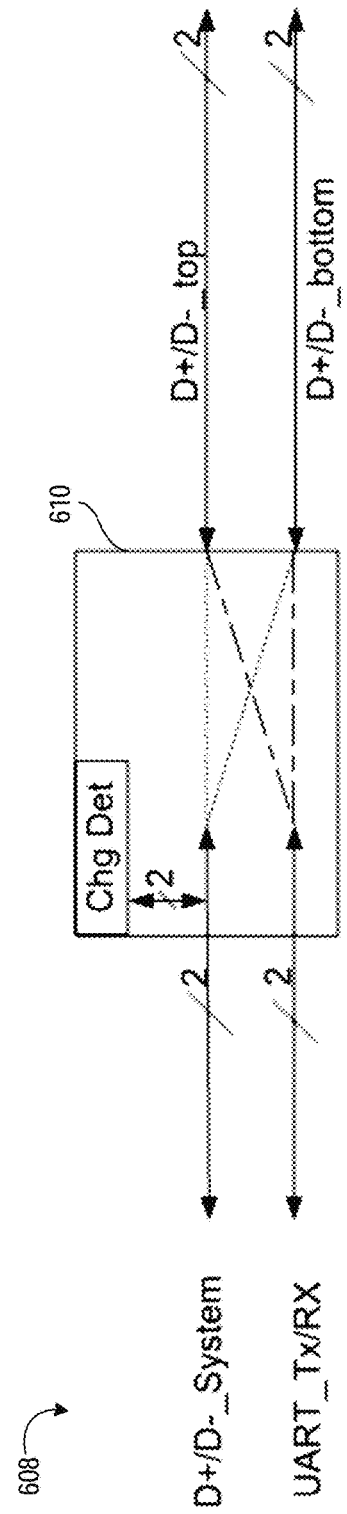
FIG. 6B is a block diagram of a DP/DM switch for USB-C connector systems, in accordance with some embodiments of the present disclosure.

FIG. 6A is a block diagram of a SBU crossbar switch 600 for USB-C connector systems, in accordance with some embodiments of the present disclosure. FIG. 6B is a block diagram of a DP/DM switch 608 for USB-C connector systems, in accordance with some embodiments of the present disclosure. In certain embodiments, as illustrated by FIGS. 6A and 6B, it may be useful to describe the present techniques with respect to a block diagram of a SBU crossbar switch 600 as illustrated by FIG. 6A and a block diagram of a DP/DM switch 608 as illustrated in FIG. 6B. For example, the SBU crossbar switch 600 may include a SBU switch MUX (e.g., 2×1 MUX) and a single 2×2 cross bar SBU switch per the Type-C port. In some embodiments, as further illustrated by FIG. 6A, the SBU crossbar switch 600 may include Display Port (DP) or Thunderbolt (TBT) block 602 that may allow selections between the Display Port or Thunderbolt modes and the routing signals to the appropriate SBU1 and/or SUB2 based on CC (e.g., Type-C plug) orientation (e.g., via either orientation) as determined by a flip orientation block 604. In some embodiments, in accordance with the present techniques, the fault protection block 606 of the SBU crossbar switch 600 and the Chg/Det block 610 of the DP/DM switch 608 may be provided the voltage protection schemes or functionality as discussed herein (e.g., implemented for each orientation and each direction of signal path).

USB Type-C Example Applications

The techniques for voltage protection described herein may be embodied in several different types of USB Type-C applications. Examples of such types of Type-C applications include, but may not be limited to: a downstream facing port (DFP) USB application, in which an IC controller with a USB Type-C subsystem is configured to provide a downstream-facing USB port (e.g., in a USB-enabled host device); an upstream facing port (UFP) USB application, in which an IC controller with a USB Type-C subsystem may be utilized to provide an upstream-facing USB port (e.g., in a USB-enabled peripheral device or adapter); and a dual role port (DRP) USB application, in which an IC controller with a USB Type-C subsystem is configured to support both DFP and UFP applications on the same USB port.

Figure 7:
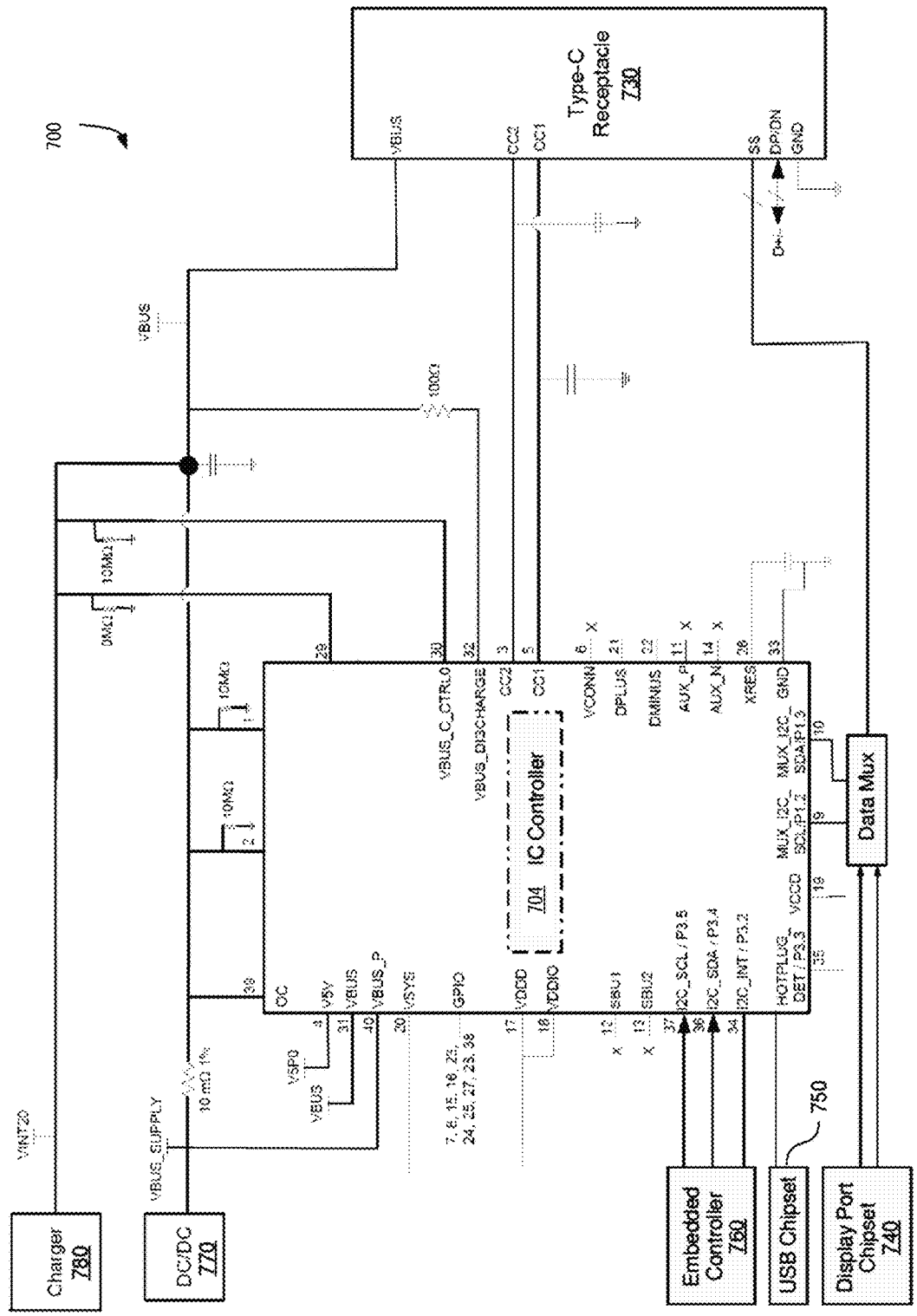
FIG. 7 is a block diagram of an example apparatus that may perform one or more of the operations described herein, in accordance with some embodiments of the present disclosure.

FIG. 7 illustrates an example system 700 in which IC controller 704 with a USB Type-C subsystem and a USB-PD subsystem is configured to provide a DRP application. In an example embodiment, IC controller 704 may be a single-chip IC device from the family of CCGx USB controllers developed by Cypress Semiconductor Corporation, San Jose, Calif. In system 700, IC controller 704 is coupled to Type-C receptacle 730, to display port chipset 740, to USB chipset 750, to embedded controller 760, to power supply 770, and to charger 780. These components of system 700 may be disposed on a printed circuit board (PCB) or other suitable substrate, and are coupled to each other by suitable means such conductive lines, traces, buses, etc.

In certain embodiments, the Type-C receptacle 730 may be configured in accordance with a USB Type-C specification to provide connectivity through a Type-C port. Display port chipset 740 is configured to provide a DisplayPort functionality through the Type-C receptacle 730. USB chipset 750 is configured to provide support for USB communications (e.g., such as USB 2.0 communications) through the D+/− lines of Type-C receptacle 730. Embedded controller 760 is coupled to IC controller 704 and is configured to provide various control and/or data transfer functions in system 700. The Power supply 770 may include a DC/DC power source that is coupled to the IC controller 704.

In certain embodiments, as previously discussed above, the IC controller 704 may include voltage detection and protection circuitry to carry out the voltage protection techniques as described above. For example, as illustrated in FIG. 7, because the voltage detection and protection circuitry is constructed as part of the IC controller 704 (e.g., on-chip), in some embodiments, singular PHY control channels may couple the respective CC1 and CC2 terminals of the IC controller 704 via a "direct connection" (e.g., which may herein refer to an electric connection via or including a passive component such as a resistor or capacitor, but without any electrical connection via an active component such as a diode or transistor) to the respective CC1 and CC2 terminals of the Type-C receptacle 730.

Specifically, by enabling the respective CC1 and CC2 terminals IC controller 704 to be directly connected (e.g., without the utilization of any active electronic component, which further constitutes a reduction of hardware) to the IC controller 704 to the respective CC1 and CC2 terminals of the Type-C receptacle 730 and including the voltage detection and protection circuitry are constructed as part of the IC controller 704 (e.g., on-chip), the present techniques may reduce, for example, response time, BOM, and power consumption of the system 700. This may also prevent or reduce damaged caused to the IC controller 704 and to other device or components that may be couple to the IC controller.

Figure 8:
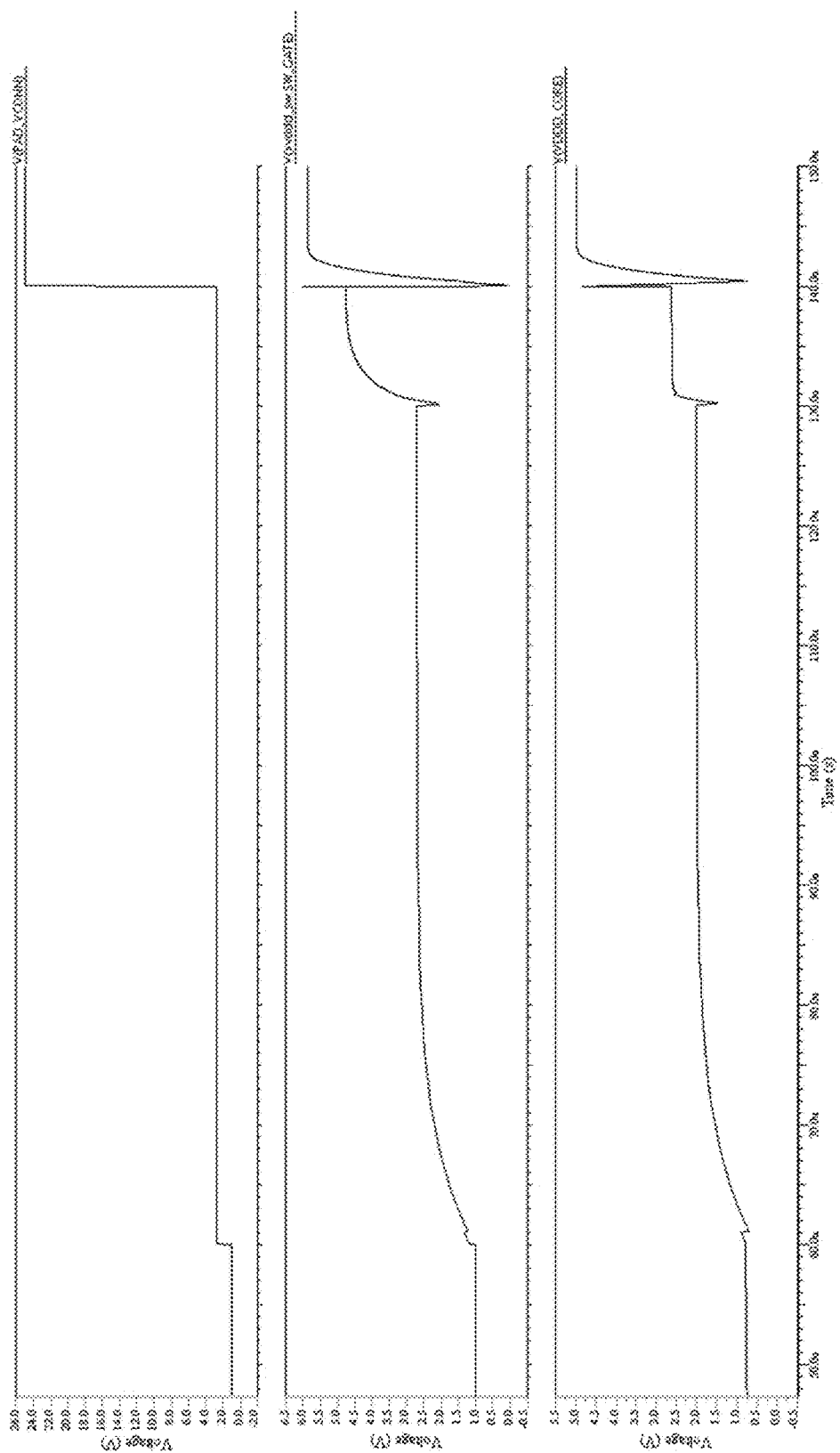
FIG. 8 is a diagram illustrating example voltages in different components of a USB controller, according to an example embodiment.

FIG. 8 is a diagram illustrating example voltages at different components of a USB controller. FIG. 8 shows the changes in voltage over time at three different components of the USB controller. The first component may be a VCONN pin and is illustrated by the top voltage waveform. The second component may be a gate of a switch that is coupled to the VCONN pin and is illustrated by the middle voltage waveform. The third component may be the output of the switch that is coupled to the VCONN pin and is illustrated by the bottom voltage waveform. As illustrated in the top voltage waveform, a short or overvoltage condition occurs at approximately 140 microseconds (μs) and the voltage on the VCONN pin increases from approximately 5V to approximately 25V. As illustrated in the middle wave form, the voltage at the gate of the switch coupled to the VCONN pin also increases at approximately 140 μs. As illustrated in the bottom wave form, the voltage at the output of the switch that is coupled to the VCONN pin also increases at approximately 140 μs, from approximately 2.75V to approximately 5V. Although the voltage at the VCONN pin (which is connected to the input of the switch) has increased to approximately 25V, one or more diode clamps (e.g., as illustrated in FIG. 4A) may prevent the voltage at the output of the switch from going to high. For example, as illustrated in the bottom waveform, the one or more diode clamps may prevent the voltage at the output of this switch from going past approximately 5V. This may help prevent damage to the components that are coupled to the output of the switch.

Figure 9:
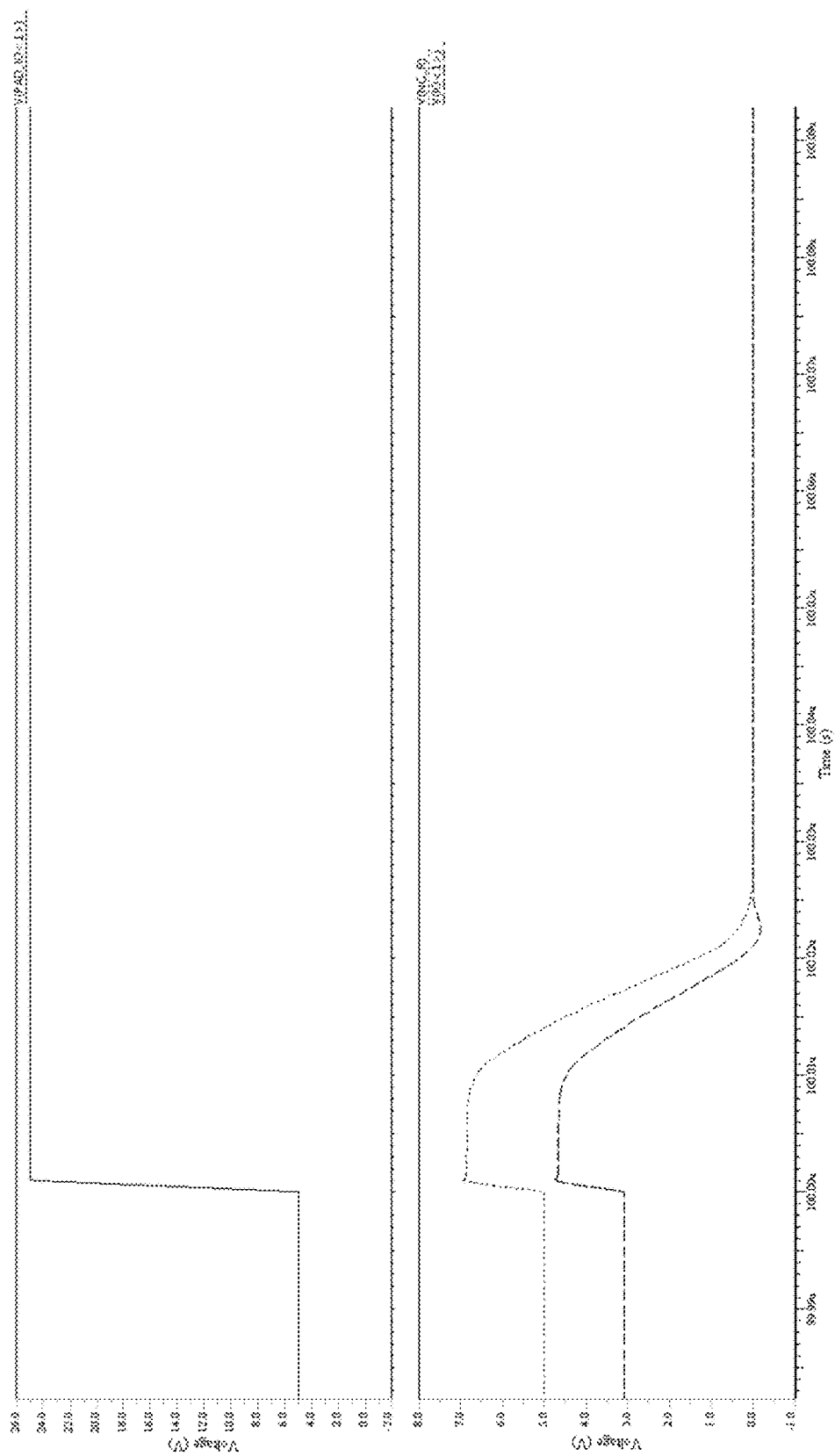
FIG. 9 is a diagram illustrating example voltages in different components of a USB controller, according to an example embodiment.

FIG. 9 is a diagram illustrating example voltages in different components of a USB controller. FIG. 9 shows the changes in voltage over time at three different components of the USB controller. The first component may be a CC or SBU pin and is illustrated by the solid voltage waveform (e.g., the solid line). The second component may be a gate of a switch that is coupled to the CC or SBU pin and is illustrated by the dotted voltage waveform (e.g., the dotted line). The third component may be the output of the switch that is coupled to the CC or SBU pin and is illustrated by the dashed waveform (e.g., the dashed line). As illustrated in the solid voltage waveform, a short or overvoltage condition occurs at approximately 100 μs and the voltage on the CC or SBU pin increases from approximately 5V to approximately 25V. As illustrated in the dotted wave form, the voltage at the gate of the switch coupled to the VCONN pin also increases at approximately 100 μs, from approximately 5V to approximately 7V. As illustrated in the dashed wave form, the voltage at the output of the switch that is coupled to the CC or SBU pin also increases at approximately 100 μs, from approximately 3V to approximately 5V. At time 100.01 μs, the switch may be deactivated (e.g., turned off) via the protection circuits discussed herein. After the switch is deactivated, the voltages at the gate of the switch and the output of the switch decrease until the voltages reach approximately 0V at time 100.025 μs. This may help prevent damage to the components that are coupled to the output of the switch.

Unless specifically stated otherwise, terms such as "detecting," "decoupling," "coupling," "activating," "deactivating," "connecting," "disconnecting," "determining," "comparing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "may include", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component.

Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. An electronic device, comprising:
a first switch configured to connect a first sideband use (SBU) terminal of a Universal Serial Bus Type-C (USB-C) controller to a first SBU terminal of a USB-C receptacle;

a second switch configured to connect a second sideband use (SBU) terminal of the USB-C controller to a second SBU terminal of the USB-C receptacle;
a voltage protection circuit configured to deactivate one or more of the first switch and the second switch when a voltage exceeding a predetermined threshold is detected, wherein the voltage protection circuit comprises:
a first set of diodes coupled to the first SBU terminal of the USB-C controller; and
a second set of diodes coupled to the second SBU terminal of the USB-C controller.

2. The electronic device of claim 1, wherein the voltage protection circuit is coupled to a voltage source configured to provide a second voltage to a gate of the first switch and a gate of the second switch.

3. The electronic device of claim 2, wherein the first switch and the second switch are activated when the voltage source provides the second voltage to the gate of the first switch and the gate of the second switch.

4. The electronic device of claim 2, wherein the first switch and the second switch are deactivated when the second voltage is not provided to the gate of the first switch and the gate of the second switch.

5. The electronic device of claim 2, wherein the voltage protection circuit further comprises:
a third switch coupled to the first set of diodes and the second set of diodes, wherein the third switch is configured to activate when the voltage exceeds the predetermined threshold;
a fourth switch couple to the first set of diodes and the second set of diodes, wherein the third switch is configured to activate when the voltage exceeds the predetermined threshold.

6. The electronic device of claim 5, wherein the voltage protection circuit further comprises:
a fifth switch coupled to third switch, wherein the fifth switch is configured to activate when the voltage exceeds the predetermined threshold; and
a sixth switch coupled to the gate of the first switch and to the gate of the second switch, wherein the sixth switch is configured to deactivate when the voltage exceeds the predetermined threshold.

7. The electronic device of claim 6, wherein deactivating the sixth switch prevents the voltage source from providing the voltage to the gate of the first switch and the gate of the second switch.

8. The electronic device of claim 1, wherein the first switch comprises a first drain-extended field effect transistor and wherein the second switch comprises a second drain-extended field effect transistor.

9. The electronic device of claim 1, wherein the predetermined threshold is based on one or more of the first set of diodes or the second set of diodes.

10. A system, comprising:
a Universal Serial Bus Type-C (USB-C) connector;
a first switch configured to connect a first sideband use (SBU) terminal of a Universal Serial Bus Type-C (USB-C) controller to a first SBU terminal of the USB-C receptacle;
a second switch configured to connect a second sideband use (SBU) terminal of the USB-C controller to a second SBU terminal of the USB-C receptacle;
a voltage protection circuit configured to deactivate one or more of the first switch and the second switch when a voltage exceeding a predetermined threshold is detected, wherein the voltage protection circuit comprises:
a first set of diodes coupled to the first SBU terminal of the USB-C controller; and
a second set of diodes coupled to the second SBU terminal of the USB-C controller.

11. The system of claim 10, wherein the voltage protection circuit is coupled to a voltage source configured to provide a second voltage to a gate of the first switch and a gate of the second switch.

12. The system of claim 11, wherein the first switch and the second switch are activated when the voltage source provides the second voltage to the gate of the first switch and the gate of the second switch.

13. The system of claim 11, wherein the first switch and the second switch are deactivated when the second voltage is not provided to the gate of the first switch and the gate of the second switch.

14. The system of claim 11, wherein the voltage protection circuit further comprises:
a third switch coupled to the first set of diodes and the second set of diodes, wherein the third switch is configured to activate when the voltage exceeds the predetermined threshold;
a fourth switch couple to the first set of diodes and the second set of diodes, wherein the third switch is configured to activate when the voltage exceeds the predetermined threshold.

15. The system of claim 14, wherein the voltage protection circuit further comprises:
a fifth switch coupled to the third switch, wherein the fifth switch is configured to activate when the voltage exceeds the predetermined threshold; and
a sixth switch coupled to the gate of the first switch and to the gate of the second switch, wherein the sixth switch is configured to deactivate when the voltage exceeds the predetermined threshold.

16. The system of claim 15, wherein deactivating the sixth switch prevents the voltage source from providing the voltage to the gate of the first switch and the gate of the second switch.

17. The system of claim 10, wherein the first switch comprises a first drain-extended field effect transistor and wherein the second switch comprises a second drain-extended field effect transistor.

18. The system of claim 10, wherein the predetermined threshold is based on one or more of the first set of diodes or the second set of diodes.

19. A method, comprising:
receiving a first voltage via a first switch coupled to a first sideband use (SBU) terminal of a Universal Serial Bus Type-C (USB-C) controller and a first SBU terminal of a USB-C receptacle;
receiving a second voltage via second switch coupled to a second SBU terminal of the USB-C controller and a second SBU terminal of the USB-C receptacle;
detecting that the first voltage at the first SBU terminal of the USB-C controller or the second voltage at the second SBU terminal of the USB-C controller exceeds as threshold voltage; and
closing the first switch and the second switch.

20. The method of claim 19, wherein the voltage is detected using one or more sets of diodes.

* * * * *